(12) United States Patent
Richardson

(10) Patent No.: US 9,604,157 B2
(45) Date of Patent: Mar. 28, 2017

(54) PUMP WITH WATER MANAGEMENT

(71) Applicant: Aperia Technologies, Inc., South San Francisco, CA (US)

(72) Inventor: Brandon Richardson, South San Francisco, CA (US)

(73) Assignee: Aperia Technologies, Inc., Burlingame, CA (US)

( * ) Notice: Subject to any disclaimer, the term of this patent is extended or adjusted under 35 U.S.C. 154(b) by 0 days.

(21) Appl. No.: 14/204,674

(22) Filed: Mar. 11, 2014

(65) Prior Publication Data

US 2014/0260969 A1     Sep. 18, 2014

Related U.S. Application Data

(63) Continuation-in-part of application No. 13/797,826, filed on Mar. 12, 2013, now Pat. No. 9,039,392.
(Continued)

(51) Int. Cl.
*B01D 19/00* (2006.01)
*C02F 1/20* (2006.01)
(Continued)

(52) U.S. Cl.
CPC .......... *B01D 19/0031* (2013.01); *B60C 23/00* (2013.01); *B60C 23/001* (2013.01); *B60C 23/003* (2013.01); *B60C 23/12* (2013.01); *B60S 5/043* (2013.01); *C02F 1/20* (2013.01); *F04B 9/04* (2013.01); *F04B 9/042* (2013.01); *F04B 17/00* (2013.01); *F04B 49/08* (2013.01);
(Continued)

(58) Field of Classification Search
CPC ... B01D 19/0031; B60C 23/00; B60C 23/001; B60C 23/003; B60C 23/12; C02F 1/20; F04B 17/00; F04B 49/08; F04B 9/04; F04B 9/042; F17D 3/00; B60S 5/043; F04C 25/00; F16F 15/1485; Y10T 137/86002; Y10T 74/2107; Y10T 74/2128
See application file for complete search history.

(56) References Cited

U.S. PATENT DOCUMENTS 1,358,524 A * 11/1920 Cooper ......................... 152/421
1,448,248 A    3/1923 H
(Continued)

FOREIGN PATENT DOCUMENTS

CN   101415946 A   4/2009
WO   2009034321 A   3/2009
(Continued)

*Primary Examiner* — Peter J Bertheaud
*Assistant Examiner* — Dominick L Plakkoottam
(74) *Attorney, Agent, or Firm* — Jeffrey Schox; Diana Lin

(57) ABSTRACT

A pumping system configured to pump fluid from the ambient environment to a target reservoir, the pumping system including: a fluid pump configured to statically mount to a rotating surface, the pump configured to rotate about an axis of rotation; a pump reservoir statically coupled to the fluid pump and configured to fluidly couple to the target reservoir, the pump reservoir including a collection area defined along a portion of the pump reservoir radially outward of the axis of rotation; and a liquid separation member arranged along a portion of the collection area, the liquid separation member including a membrane configured to preferentially permit liquid flow therethrough.

21 Claims, 7 Drawing Sheets

Related U.S. Application Data

(60) Provisional application No. 61/778,288, filed on Mar. 12, 2013.

(51) Int. Cl.

| | | |
|---|---|---|
| *B60S 5/04* | (2006.01) | |
| *F04C 25/00* | (2006.01) | |
| *F16F 15/14* | (2006.01) | |
| *B60C 23/00* | (2006.01) | |
| *B60C 23/12* | (2006.01) | |
| *F04B 9/04* | (2006.01) | |
| *F04B 17/00* | (2006.01) | |
| *F04B 49/08* | (2006.01) | |
| *F17D 3/00* | (2006.01) | |

(52) U.S. Cl.
CPC .......... *F04C 25/00* (2013.01); *F16F 15/1485* (2013.01); *F17D 3/00* (2013.01); *Y10T 74/2107* (2015.01); *Y10T 74/2128* (2015.01); *Y10T 137/86002* (2015.04)

(56) References Cited

U.S. PATENT DOCUMENTS

| | | |
|---|---|---|
| 2,211,935 A | 8/1940 | Parker |
| 2,415,618 A | 2/1947 | West |
| 2,899,907 A | 8/1959 | Becher |
| 2,962,119 A | 11/1960 | White |
| 3,012,820 A | 12/1961 | King |
| 3,047,339 A | 7/1962 | Hamer |
| 3,152,553 A | 10/1964 | Sverker |
| 3,175,507 A | 3/1965 | Sverker |
| 3,249,059 A | 5/1966 | Renn |
| 3,400,074 A | 9/1968 | Grenci |
| 3,452,801 A | 7/1969 | Warren et al. |
| 3,511,294 A | 5/1970 | Bepristis et al. |
| 3,532,449 A | 10/1970 | Garton |
| 3,730,215 A | 5/1973 | Conery et al. |
| 3,886,974 A | 6/1975 | Bjorklund |
| 3,981,633 A | 9/1976 | Wall |
| 4,018,579 A | 4/1977 | Hofmann |
| 4,030,300 A | 6/1977 | Thompson |
| 4,095,923 A | 6/1978 | Cullis |
| 4,121,472 A | 10/1978 | Vural et al. |
| 4,157,530 A | 6/1979 | Merz |
| 4,256,971 A | 3/1981 | Griffith |
| 4,291,235 A | 9/1981 | Bergey, Jr. et al. |
| 4,370,894 A | 2/1983 | Sturesson |
| 4,460,006 A | 7/1984 | Kolze |
| 4,536,668 A | 8/1985 | Boyer |
| 4,606,710 A | 8/1986 | Maguire |
| 4,637,152 A | 1/1987 | Roy |
| 4,651,792 A * | 3/1987 | Taylor .......... 152/415 |
| 4,744,399 A | 5/1988 | Magnuson et al. |
| 4,768,542 A | 9/1988 | Morris |
| 4,807,487 A | 2/1989 | Seidl |
| 4,819,593 A | 4/1989 | Bruener et al. |
| 4,852,528 A | 8/1989 | Richeson et al. |
| 4,893,459 A | 1/1990 | Orlando |
| 4,895,199 A | 1/1990 | Magnuson et al. |
| 4,910,148 A | 3/1990 | Sorensen et al. |
| 4,922,984 A | 5/1990 | Dosjoub et al. |
| 5,018,797 A | 5/1991 | Takata |
| 5,052,456 A | 10/1991 | Dosjoub |
| 5,173,038 A | 12/1992 | Hopfensperger et al. |
| 5,201,968 A | 4/1993 | Renier |
| 5,293,919 A | 3/1994 | Olney et al. |
| 5,325,902 A | 7/1994 | Loewe et al. |
| 5,342,177 A | 8/1994 | Cheng |
| 5,370,711 A | 12/1994 | Audit et al. |
| 5,375,984 A | 12/1994 | Wehling |
| 5,388,470 A | 2/1995 | Marsh, Jr. |
| 5,409,049 A | 4/1995 | Renier |
| 5,413,159 A | 5/1995 | Olney et al. |
| 5,429,927 A | 7/1995 | Afseth et al. |
| 5,468,129 A | 11/1995 | Sunden et al. |
| 5,482,447 A | 1/1996 | Sunden et al. |
| 5,495,879 A | 3/1996 | Cabestrero |
| 5,512,439 A | 4/1996 | Hornes et al. |
| 5,525,493 A | 6/1996 | Hornes et al. |
| 5,538,062 A | 7/1996 | Stech |
| 5,591,281 A | 1/1997 | Loewe |
| 5,646,727 A | 7/1997 | Hammer et al. |
| 5,667,606 A | 9/1997 | Renier |
| 5,707,215 A | 1/1998 | Olney et al. |
| 5,759,820 A | 6/1998 | Hornes et al. |
| 5,894,757 A | 4/1999 | Sully |
| 5,941,692 A | 8/1999 | Olney et al. |
| 5,941,696 A | 8/1999 | Fenstermacher et al. |
| 6,092,545 A | 7/2000 | Bedore et al. |
| 6,144,295 A | 11/2000 | Adams et al. |
| 6,267,450 B1 | 7/2001 | Gamble |
| 6,360,768 B1 | 3/2002 | Galler |
| 6,463,798 B2 | 10/2002 | Niekerk et al. |
| 6,474,832 B2 | 11/2002 | Murray |
| 6,482,592 B1 | 11/2002 | Lundeberg et al. |
| 6,494,693 B1 | 12/2002 | Sunden |
| 6,742,386 B1 | 6/2004 | Larson |
| 6,744,356 B2 | 6/2004 | Hamilton et al. |
| 6,787,233 B1 | 9/2004 | Molteberg et al. |
| 6,814,547 B2 | 11/2004 | Childers et al. |
| 6,871,683 B2 | 3/2005 | Cobb |
| 6,984,702 B2 | 1/2006 | Fonnum et al. |
| 6,986,913 B2 | 1/2006 | Fonnum et al. |
| 6,994,136 B2 | 2/2006 | Stanczak |
| 7,117,731 B2 | 10/2006 | Hrabal |
| 7,160,707 B2 | 1/2007 | Fonnum et al. |
| 7,173,124 B2 | 2/2007 | Deggerdal et al. |
| 7,217,762 B1 | 5/2007 | Joergedal et al. |
| 7,222,487 B1 | 5/2007 | Hinkley |
| 7,225,845 B2 | 6/2007 | Ellmann |
| 7,237,590 B2 | 7/2007 | Loewe |
| 7,255,323 B1 | 8/2007 | Kadhim |
| 7,357,164 B2 | 4/2008 | Loewe |
| 7,498,683 B2 | 3/2009 | Landwehr |
| 7,506,663 B2 | 3/2009 | Thomas et al. |
| 7,581,576 B2 * | 9/2009 | Nakano .......... 152/421 |
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,763,689 B2 | 7/2010 | Fonnum et al. |
| 7,784,513 B2 | 8/2010 | Loewe |
| 7,810,582 B2 | 10/2010 | Webb |
| 7,828,095 B2 | 11/2010 | Murata et al. |
| 7,828,101 B2 | 11/2010 | Radtke et al. |
| 7,847,421 B2 | 12/2010 | Gardner et al. |
| 7,856,871 B2 | 12/2010 | Mancosu et al. |
| 7,927,170 B2 | 4/2011 | Bickerton et al. |
| 7,931,061 B2 | 4/2011 | Gonska et al. |
| 7,931,817 B2 | 4/2011 | Bilski |
| 7,975,789 B2 | 7/2011 | Murata |
| 7,985,340 B2 | 7/2011 | Almaasbak et al. |
| 7,989,614 B2 | 8/2011 | Deggerdal et al. |
| 7,989,975 B2 | 8/2011 | Clement et al. |
| 8,004,104 B2 | 8/2011 | Hench |
| 8,022,561 B2 | 9/2011 | Ciglenec et al. |
| 8,038,987 B2 | 10/2011 | Fonnum et al. |
| 8,042,586 B2 | 10/2011 | Losey et al. |
| 8,083,503 B2 | 12/2011 | Voltenburg, Jr. et al. |
| 8,110,351 B2 | 2/2012 | Bosnes |
| 8,113,254 B2 | 2/2012 | Benedict |
| 8,747,084 B2 | 6/2014 | Richardson et al. |
| 2004/0050760 A1 | 3/2004 | Siegfriedsen |
| 2007/0018458 A1 | 1/2007 | Martinez |
| 2007/0040135 A1 | 2/2007 | Dyer et al. |
| 2007/0068238 A1 | 3/2007 | Wendte |
| 2007/0151648 A1 | 7/2007 | Loewe |
| 2008/0247883 A1 | 10/2008 | Yokomachi et al. |
| 2009/0301575 A1 | 12/2009 | Arnett |
| 2010/0243121 A1 | 9/2010 | Eigenbrode |
| 2011/0018275 A1 | 1/2011 | Sidenmark |

(56) References Cited

U.S. PATENT DOCUMENTS

| | | |
|---|---|---|
| 2011/0061621 A1 | 3/2011 | Finkenbiner |
| 2011/0308953 A1 | 12/2011 | Bazant et al. |
| 2012/0020822 A1* | 1/2012 | Richardson et al. ...... 417/477.2 |
| 2013/0251553 A1 | 9/2013 | Richardson et al. |
| 2014/0186195 A1 | 7/2014 | Richardson et al. |

FOREIGN PATENT DOCUMENTS

| | | |
|---|---|---|
| WO | 2009110001 A1 | 9/2009 |
| WO | 2012012617 A | 1/2012 |

\* cited by examiner

PUMP WITH WATER MANAGEMENT

CROSS-REFERENCE TO RELATED APPLICATIONS

This application claims the benefit of U.S. Provisional Application No. 61/778,288 filed 12 Mar. 2013, which is incorporated in its entirety by this reference. This application is a continuation-in-part of U.S. application Ser. No. 13/797,826 filed 12 Mar. 2013, which is incorporated in its entirety by this reference.

TECHNICAL FIELD

This invention relates generally to the pump field, and more specifically to a new and useful tire inflator in the pump field.

BACKGROUND

In many inflation applications, such as tire inflation applications, it is highly desirable to prevent incompressible liquids from being pumped into the end container (e.g., the tire). However, as many inflation applications use water-laden ambient air as the fluid source, liquid contamination within the end container is oftentimes a problem. Thus, there is a need in the inflation field to create a new and useful pumping system with water management.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
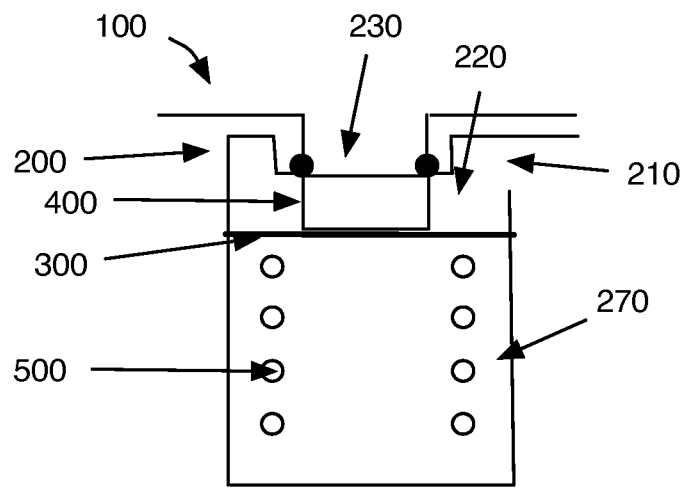
FIGS. 1A and 1B are schematic representation of a variation of the extraction mechanism in the closed and open states, respectively.
Figure 1B:
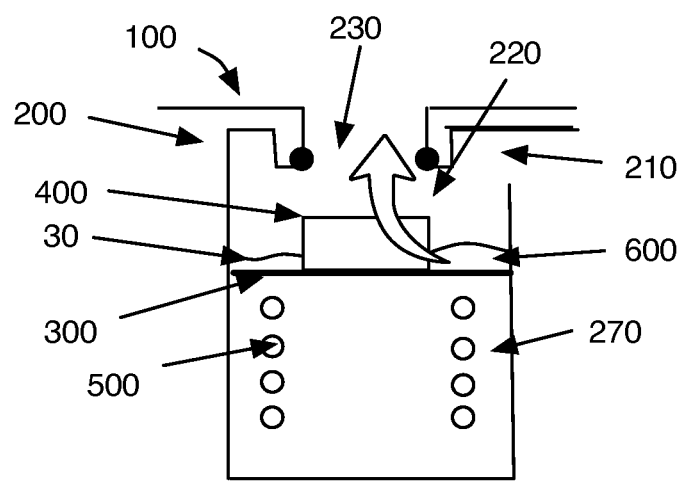

As shown in FIGS. 1A and 1B, the contaminant extraction mechanism 100 includes a housing 200 including an inlet 210 and a first outlet 230, a selection mechanism 300 fluidly connected between the inlet 210 and the first outlet 230, and a sealing member 400 that selectively opens the second outlet 250 to expel the separated contaminants. The housing 200 can additionally include a second outlet 250. The extraction mechanism 100 functions to remove contaminants, such as water and solid particulates from a pumped gaseous stream. The extraction mechanism 100 preferably additionally functions to vent the contaminants 30 out to the ambient environment, but can alternatively guide the contaminants 30 to a contaminant collector or any other suitable reservoir. The extraction mechanism 100 can additionally function to adjust the thermal properties of the gaseous stream, the flow properties of the gaseous stream, or any other suitable physical or chemical property of the gaseous stream. The extraction mechanism 100 is preferably a passive system, but can alternatively be an actively driven or controlled system.

The extraction mechanism 100 is preferably operable between a closed mode (as shown in FIG. 1A), wherein the sealing member 400 rests against and substantially seals the first outlet 230, and an open mode (as shown in FIG. 1B), wherein the sealing member 400 is distal the first outlet 230 and permits fluid flow from the inlet 210 to the first outlet 230. Alternatively, the extraction mechanism 100 can be operable between a continuous series of modes, based on the applied pressure differential across the separation mechanism. However, the extraction mechanism 100 can be operable between any other suitable mode.

In extraction mechanism operation, water and other contaminants preferably ingress into the extraction mechanism 100 through the inlet 210 and collects against the sealing member 400 and/or selection mechanism 300 in the closed mode. The sealing member 400 preferably remains in the closed mode while an upstream force remains below a threshold force. In response to the upstream force exceeding the threshold force, the sealing member 400 is preferably translated away from the first outlet 230 into the open mode, thereby unsealing the first outlet 230 and permitting contaminant flow from the extraction mechanism 100 into a second reservoir fluidly connected to the first outlet 230 (e.g., the ambient environment). The upstream force preferably translates the sealing member 400 from the closed to the open position, but any other suitable force or mechanism can translate the sealing member 400 from the closed to the open position. The upstream force can be applied by the water mass on the sealing member 400 (e.g., in conjunction with gravity, centrifugal force, or another exterior force), by pressure generated by the pump 40, by built-up pressure due to the contaminants blocking the flow of pumped fluid 13 through the selection mechanism 300, or due to any other suitable force. The threshold force is preferably the biasing force that biases the sealing member 400 toward the closed position, but can alternatively be a virtual force threshold, wherein an active member actuates the sealing member 400 in response to the upstream pressure or force, as measured by a pressure monitor disposed in the collection area 600 or upstream area, exceeding the threshold value. The biasing force is preferably a return force generated by a return element 500 coupled to the sealing member 400 (e.g., a spring force, attractive magnetic force, etc.), but can additionally or alternatively be a return force generated by the deformed component separation mechanism, a return force generated by backpressure from the first reservoir 20, or any other suitable force element.

Figure 2:
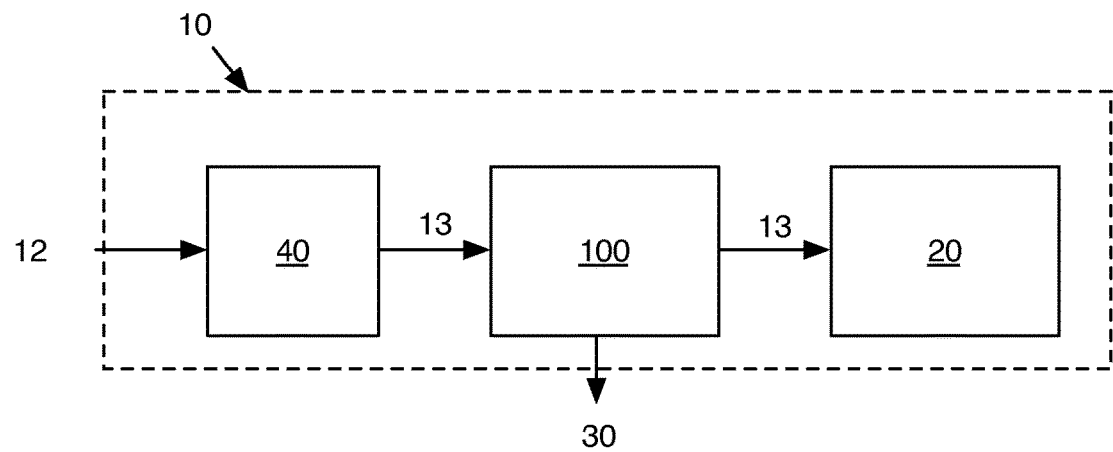
FIG. 2 is a schematic representation of a flow diagram of the pumping system.

As shown in FIG. 2, the extraction mechanism 100 is preferably utilized within a pump system 10 including a pump 40. The pump system 10 can additionally include a first reservoir 20. The extraction mechanism 100 is preferably arranged across the fluid path between the pump 40 and the first reservoir 20, such that pumped fluid 13 must flow through the extraction mechanism 100 prior to reservoir entry. Water, solids, or other contaminants collect on the pump side of the extraction mechanism 100 while gas is preferentially passed through, thereby removing the contaminants from the gas flow. Alternatively, the extraction mechanism 100 can be arranged along a portion of the fluid path (e.g., with the first outlet 230 perpendicular to a direction of pumped fluid 13 flow), arranged within the pump 40, within the reservoir 20, or arranged along any other suitable portion of the pump system 10. The extraction mechanism 100 is preferably fluidly connected between a pump outlet and an inlet 210 of the first reservoir 20, wherein the extraction mechanism 100 functions as a three-way valve, but can alternatively be fluidly connected to the pump outlet and a second reservoir, or have any other suitable fluid connection configuration.

The pump system 10 functions to pump a fluid from a fluid source 12 into a first reservoir 20, which is preferably fluidly connected to a target reservoir, such as a tire interior 3. The pump 40 preferably pumps a gas, but can alternatively pump any other suitable fluid. The gas is preferably air, but can alternatively be any other suitable gas. The fluid source is preferably the ambient environment, but can alternatively be a canister of gas or any other suitable gas source. The first reservoir 20 is preferably an intermediary reservoir between the pump 40 and a target reservoir, such as a tire interior, but can alternatively be any suitable fluid reservoir. The first reservoir 20 is preferably high-pressure reservoir capable of maintaining an interior fluid pressure higher than the ambient atmospheric pressure, but can alternatively be any other suitable reservoir. The pump 40 is preferably configured to statically couple to a rotating surface 1 (e.g., that rotates relative to a gravity vector or another external reference point) with mounting points 2 and to convert the rotational motion into a substantially linear pumping motion (e.g., parallel or perpendicular to the axis of rotation 4). However, the pump 40 can be configured to remain substantially static relative to the gravity vector, wherein a motor or other drive mechanism drives pump pumping. The pump 40 is preferably a positive displacement pump, more preferably a reciprocating pump (e.g., a diaphragm or piston pump), but can alternatively be a peristaltic pump or any other suitable pump. For example, the extraction mechanism 100 can be used within HVAC systems or any suitable application requiring liquid removal from a gaseous stream.

Figure 3:
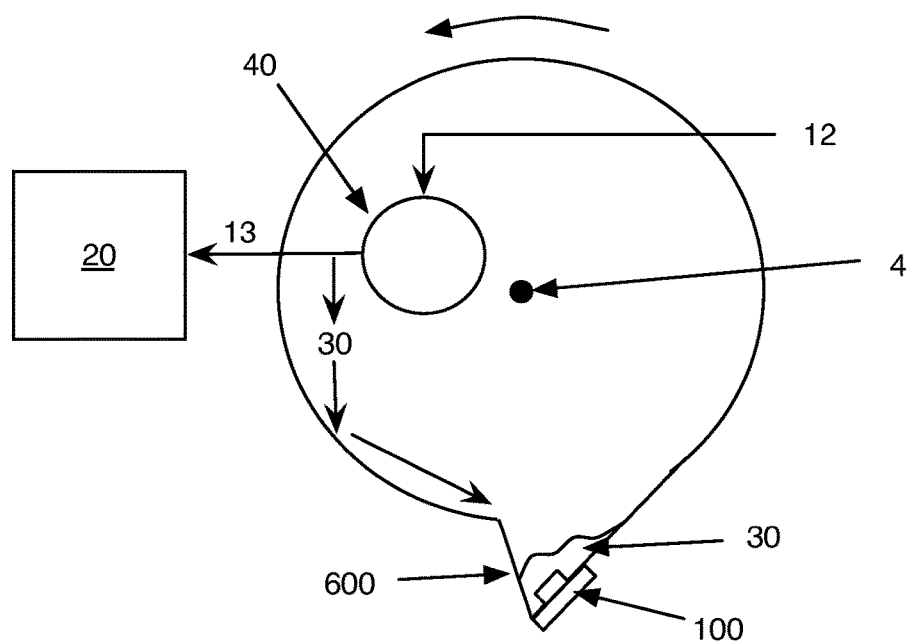
FIG. 3 is a schematic representation of a first variation of the extraction mechanism, incorporated within a first variation of a pumping system that is configured to statically couple to a rotating surface.
Figure 4A:
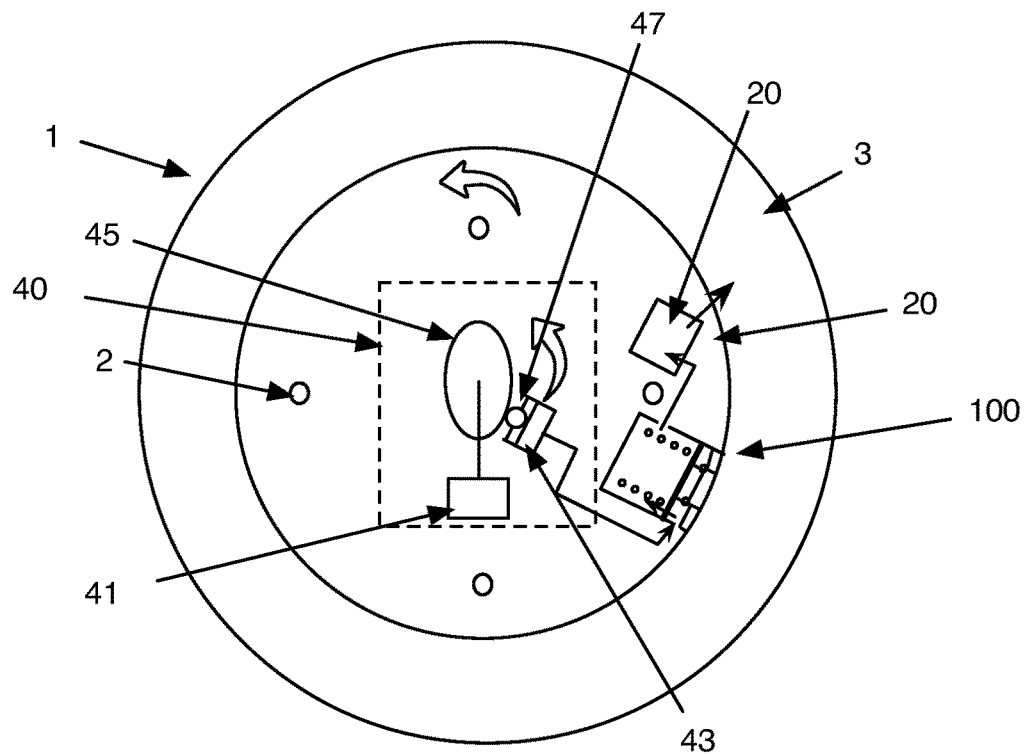
FIGS. 4A and 4B are a schematic representation of a second variation of the extraction mechanism incorporated within a second variation of the pumping system coupled to the rotating surface.
Figure 4B:
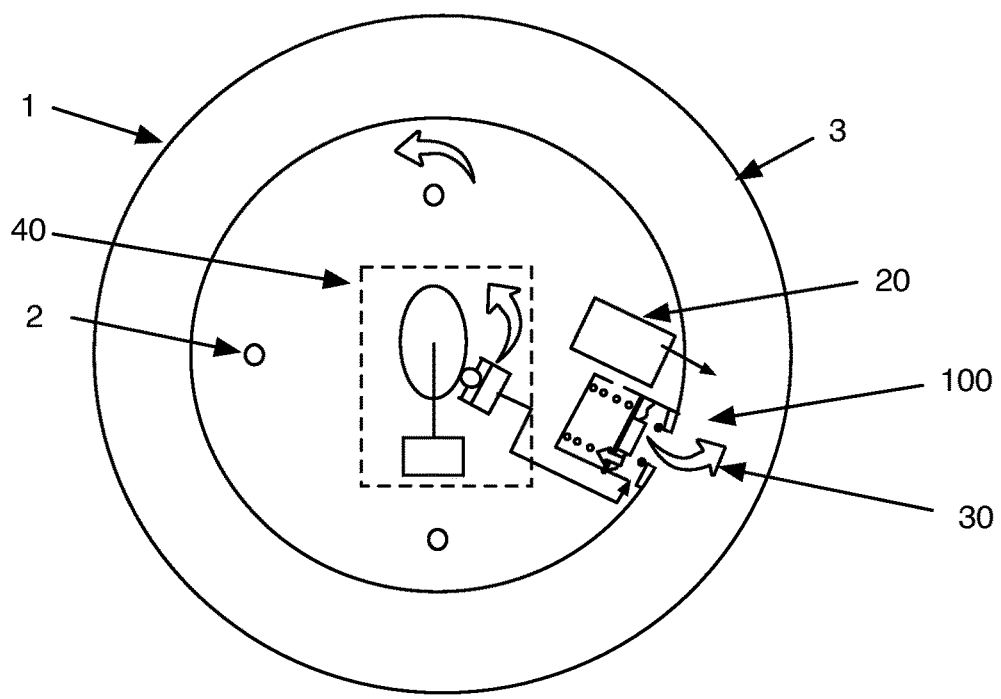

As shown in FIGS. 3, 4A, and 4B, the pump 40 preferably leverages the rotating motion of the rotating surface to pump gas from the ambient environment into the reservoir. The pump 40 preferably includes a gravity element 41 or reference element that remains substantially static relative to a gravity vector or reference point (e.g., within a given angular range of the gravity vector) and a pumping member 43 (e.g., a piston pump or a diaphragm pump) that rotates relative to the gravity element and leverages the relative movement to pump fluid. However, the pump 40 can be configured to remain substantially static relative to a gravity vector or configured in any other suitable manner.

The pump 40 can be the pump as described in U.S. application Ser. No. 13/188,400, filed 21 Jul. 2011, in U.S. application Ser. No. 13/187,949, filed 21 Jul. 2011, in U.S. application Ser. No. 13/797,826, filed 40-MAR-2013, incorporated herein in their entireties by this reference, or any other suitable rotational pump.

The pump 40 can be a reciprocating pump including a reciprocating member and a pump body 43 that is statically connected to the rotating surface, wherein the pump 40 is driven by a drive mechanism that includes a cam 45 rotatably coupled to the rotational axis of the rotating surface, an eccentric mass 41 coupled to the cam, and a force translator 47 connected to the reciprocating member and in non-slip contact with the cam. In operation, the eccentric mass retains the position of the cam relative to a gravity vector as the reciprocating pump 40 rotates relative to the cam, about the rotational axis. The force translator couples the reciprocating member to the cam, and translates any variations in the distance between the bearing surface of the cam (e.g., the surface that the force translator couples to) into a linear reciprocation of the reciprocating member. The bearing surface can be an interior bearing surface (e.g., wherein the reciprocating pump 40 is encircled by the cam) or can be in exterior bearing surface (e.g., wherein the reciprocating pump 40 rotates about the cam exterior). However, the pump 40 can be driven by a linear actuator, combustion, or have any other suitable configuration.

Figure 9A:
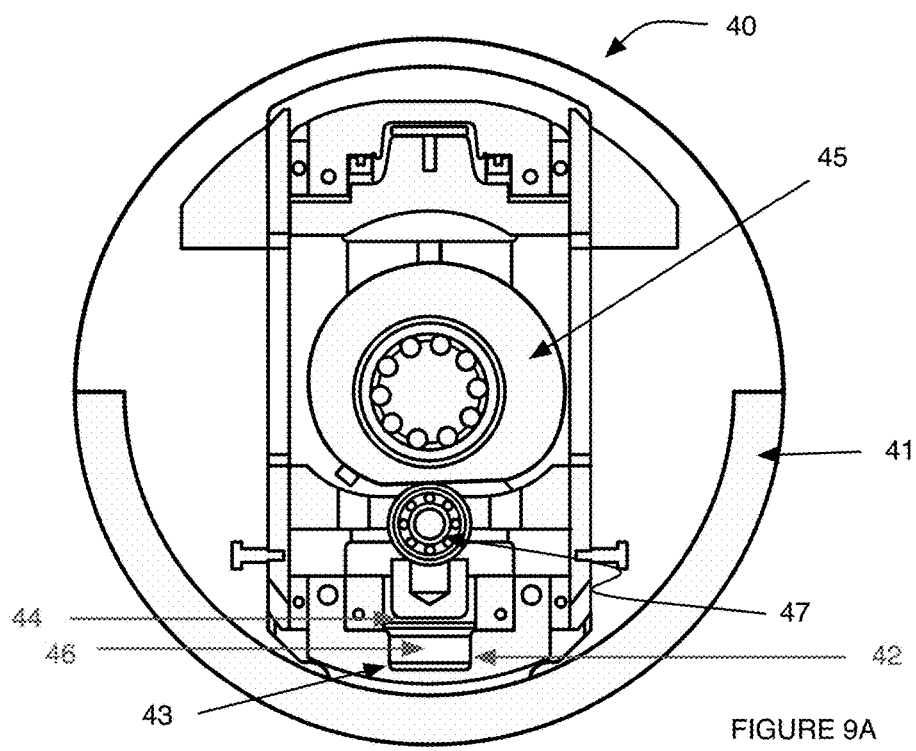
FIGS. 9A and 9B are schematic representations of a fourth variation of the pump in a first and a second position, respectively.
Figure 9B:
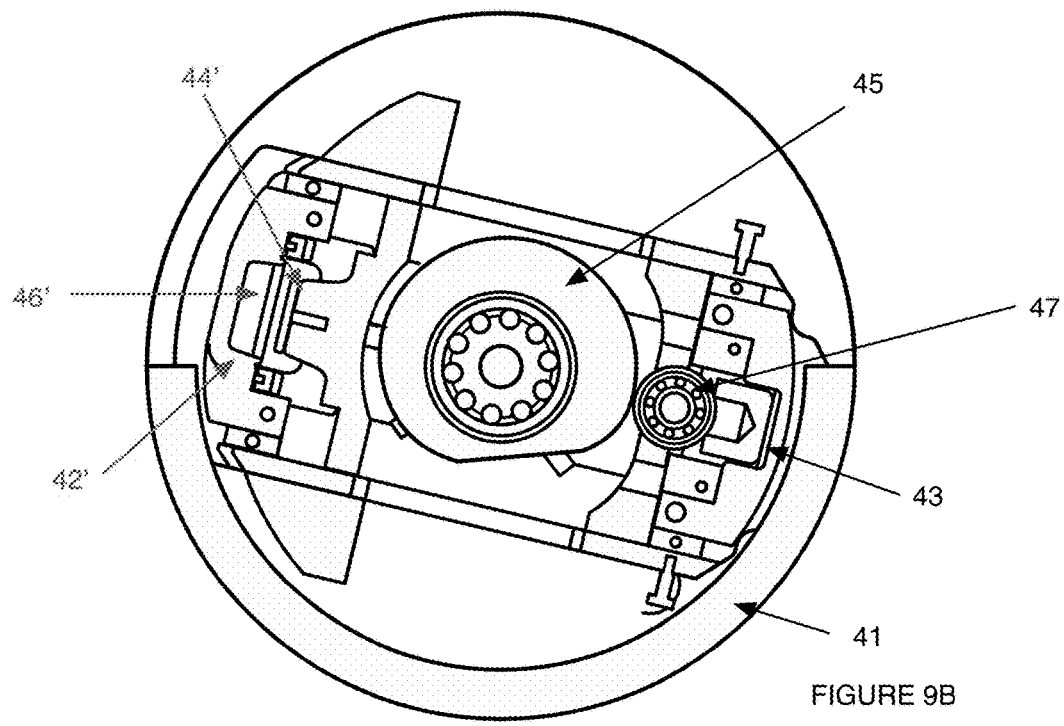
Figure 10:
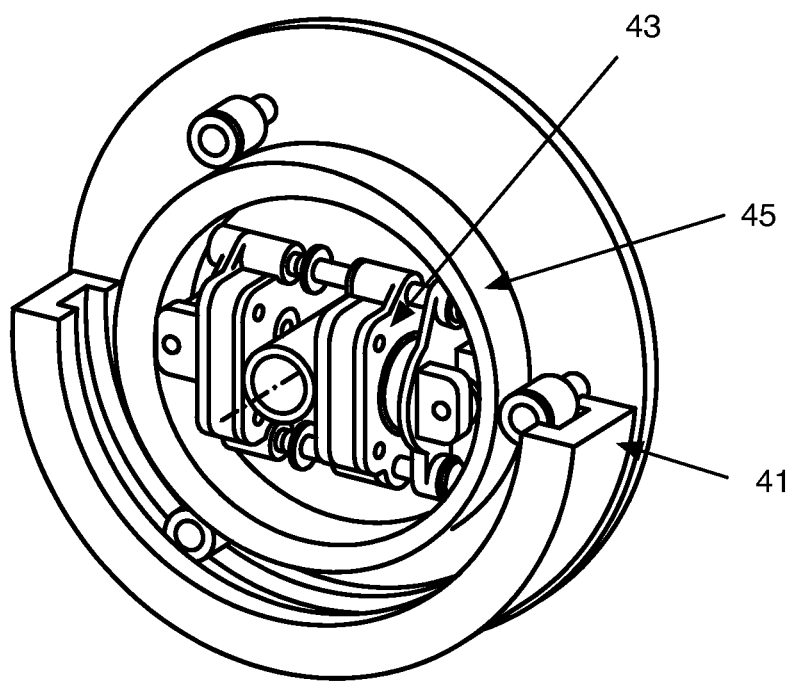
FIG. 10 is a schematic representation of a fifth variation of the pump.

As shown in FIGS. 9A and 9B, the pump 40 can include a drive mechanism including an arcuate bearing surface and an eccentric mass coupled to the arcuate bearing surface, a pump mechanism (pump cavity) including a pump chamber 42 and an actuating element 44, and a force translator coupling the arcuate bearing surface to the actuating element 44.

The drive mechanism preferably has a rotational axis, wherein the pump is preferably mounted to the rotating surface such that the rotational axis of the drive mechanism is substantially coaxial with the rotating surface rotational axis, but can alternatively be mounted to the rotating surface in any other suitable configuration. The arcuate bearing surface is preferably the surface of a cam rotatable about the rotational axis, but can alternatively be the arcuate bearing surface of any other suitable pump component. The arcuate bearing surface preferably has a non-uniform curvature, but can alternatively have a uniform curvature or any other suitable curvature. In one variation, the arcuate bearing surface has a first section having high curvature adjacent a second section having low curvature. The arcuate bearing surface can additionally include a third section between the first and second sections, the third section having curvature varying from a low curvature proximal the second section to a high curvature proximal the first section. The arcuate bearing surface is preferably the outer perimeter of the cam, but can alternatively be an inner perimeter of the cam, a broad face of the cam, or be any other suitable cam surface.

The drive mechanism can additionally include a mass couple operable between: a coupled mode wherein the mass couple connects the eccentric mass to the cam, and a decoupled mode wherein the mass couple disconnects the eccentric mass from the cam. In one variation, the mass couple couples to an interior bearing surface of the cam, wherein in the coupled mode, the mass couple is statically coupled to an interior bearing surface of the cam, and in the decoupled mode, the mass couple is rotatably coupled to the interior bearing surface.

The eccentric mass functions to offset a center of mass of the drive mechanism from the rotational axis. The eccentric mass can be incorporated into the cam such that the eccentric mass and cam form a unitary piece, or can be coupled to the cam by an arm or any other suitable coupling mechanism. The cam is preferably statically coupled to the eccentric mass, more preferably transiently statically coupled to the eccentric mass, but can alternatively be substantially permanently statically coupled to the eccentric mass. The eccentric mass can be a singular piece, or can be formed from multiple pieces. In one variation, the eccentric mass includes a first and a second piece, wherein the eccentric mass is operable between: a pumping mode wherein the first piece is adjacent the second piece; and a non-pumping mode wherein the first piece is distal the second piece.

The pump mechanism is preferably positioned a radial distance away from the axis of rotation and rotatably coupled to the cam. The pump mechanism is preferably coupled radially outward of the cam, but can alternatively be coupled radially inward of the cam. The actuating element preferably actuates along an actuating axis. The actuating axis is preferably rotatably connected to the rotation axis, but can alternatively be otherwise configured relative to the rotation axis. The actuating element of the pump mechanism is preferably a piston, but can alternatively be a diaphragm (e.g., a rolling diaphragm), tube, or any other suitable actuating element.

The force translator preferably includes an axis having an arcuate position fixed to an arcuate position of the pump mechanism. More preferably, the force translator axis can be fixed to the actuating axis of the actuating element. The force translator is preferably a roller element, wherein the force translator axis is preferably the roller element rotational axis. However, the force translator can be an arm linkage or any other suitable force translator. The roller is preferably in non-slip contact with the arcuate bearing surface, but can alternatively be otherwise arranged relative to the arcuate bearing surface.

The pump 40 can additionally include a torque stabilization mechanism configured to accommodate a force of the actuating element on the cam during a return stroke. The torque stabilization mechanism is preferably used with the mass couple, but can alternatively be utilized in variations of the pump 40 without the mass couple. In one variation, the torque stabilizing mechanism can include a profiled channel defined between the interior bearing surface and the mass couple, the profiled channel having a low clearance section and a high clearance section, the torque stabilizing mechanism further including a mobile element having a dimension substantially equal to the low clearance section and smaller than the high clearance section, the mobile element located within the profiled channel, wherein the torque stabilizing mechanism switches the mass couple between a coupled mode, wherein the mobile element is located in the low clearance section and retains a position of the mass couple with the interior bearing surface, and the decoupled mode, wherein the mobile element is located in the high clearance section and permits relative motion between the mass couple and the interior bearing surface. The high clearance section is preferably substantially radially aligned with the first section of the arcuate bearing surface, but can alternatively be offset or otherwise arranged.

The pump 40 can additionally include a second pump mechanism and a second force translator. The second pump mechanism preferably includes a second actuating element 44' and a second chamber 42'. The second force translator preferably couples the arcuate bearing surface to the second actuating element, and preferably includes a second axis having a second arcuate position fixed to an arcuate position of the second pump mechanism. The second pump mechanism is preferably substantially similar to the first, but can alternatively be a different pump mechanism. The second actuating element preferably includes a larger actuating area than the first actuating element, but can alternatively have an actuating area similar to or smaller than the first actuating element. The second pump mechanism is preferably fluidly connected to the first pump mechanism to form a two-stage pump mechanism, but can alternatively be fluidly isolated from the first pump mechanism. An inlet to the first pump mechanism is preferably fluidly connected to an outlet of the second pump mechanism, wherein the outlet of the first pump mechanism is preferably fluidly connected to the reservoir and the inlet of the second pump mechanism is preferably transiently fluidly connected to the ambient environment. However, the outlet of the first pump mechanism can alternatively be fluidly connected to an inlet of the second pump mechanism. The second pump mechanism is preferably operable between: a compressed position wherein the second actuating element is substantially proximal a closed end of the second chamber; a recovered position wherein the second actuating element is located at a first position distal a closed end of the second chamber; and a pressurized position wherein the second actuating element is located at a second position distal the chamber, the second position further from the chamber than the first position, wherein the second actuating element is placed in the pressurized position in response to a pressure of the reservoir surpassing the opening pressure, wherein the frame is placed in the non-pumping position when the second pump cavity 46' is placed in the pressurized position. However, the second pump mechanism can be only operable between the compressed and recovered position, or be operable between any other suitable positions.

The pump 40 can additionally include a passive pressure regulation system comprising a passive valve fluidly connected to a reservoir, the reservoir fluidly connected to an outlet of the first pump cavity, the passive valve having a opening threshold pressure and a closing threshold pressure lower than the opening threshold pressure, the passive valve operable between: an open mode in response to a reservoir pressure exceeding the opening threshold pressure, wherein the passive valve permits fluid flow from the reservoir; and a closed mode in response to a reservoir pressure falling below the closing threshold pressure, wherein the passive valve prevents fluid flow from the reservoir.

The pump 40 can additionally include a fluid manifold fluidly connecting the first pump cavity, the second pump cavity, and a reservoir fluidly coupled to the first and second pump cavities, wherein the passive valve is located within the fluid manifold, wherein: in the open mode, the passive valve permits fluid flow from the reservoir to the first and second pump cavities; and in the closed mode, the passive valve prevents fluid flow from the reservoir to the first and second pump cavities.

The pump 40 can additionally include a frame statically connecting the first force translator (e.g., first axis) with the second force translator (e.g., second axis), the frame operable between: a pumping position wherein the frame places the first force translator in non-slip contact with the arcuate bearing surface, wherein the second force translator is connected to the arcuate bearing surface through the first force translator and the frame; and a non-pumping position, wherein the frame disconnects the first force translator from the arcuate bearing surface and slidably couples the second force translator to the arcuate bearing surface. The frame center is preferably located at a first radial position in the pumping position and at a second radial position in the non-pumping position, wherein the first radial position is different from the second radial position. However, the frame can be otherwise arranged in the pumping and non-pumping positions.

The pump 40 can additionally include a housing coupled to the drive mechanism and the pump mechanism. The housing is preferably configured to statically mount to the rotating surface, wherein the rotating surface configured to rotate relative to a gravity vector. More preferably, the housing is configured to mount to the hub of a wheel. However, the housing can alternatively mount to any other suitable rotating surface. The housing preferably encloses the drive mechanism, the pump mechanism(s), and the force translator. The housing preferably functions as the reservoir, but can alternatively define the reservoir or statically retain the reservoir relative to the pump chamber.

The pump 40 can additionally include a relief valve operable between an open state wherein the relief valve fluidly connects a reservoir to the housing interior, the reservoir fluidly connected to an outlet of the pump cavity, and a closed state wherein the relief valve substantially prevents fluid flow from the reservoir to the housing interior.

As shown in FIGS. 1A and 1B, the housing 200 (casing) of the extraction mechanism 100 functions to encapsulate and protect the extraction mechanism components. The housing 200 can additionally function to define the inlet 210 (valve inlet 210) and first outlet 230 (valve channel), and can additionally define a fluid channel fluidly connecting the inlet 210 to the first outlet 230. The housing 200 can additionally define a second outlet 250 (valve outlet) fluidly connected to a second reservoir (e.g., the ambient environment), wherein the housing 200 can additionally define a second fluid channel fluidly connecting the inlet 210 and the second outlet 250. The housing 200 can additionally function to support the sealing member 400. The housing 200 can additionally function to support and/or define the selection mechanism 300. The housing 200 can additionally define a member channel 270 in which sealing member 400 translates. The housing 200 can additionally function to cooperatively build pressure on the upstream side of the selection mechanism 300 with the selection mechanism 300. The housing 200 is preferably formed as a singular piece, but can alternatively be formed from multiple pieces statically connected together. The housing 200 is preferably substantially rigid, but can alternatively be flexible. The housing 200 is preferably non-ferrous and non-metallic, but can alternatively be ferrous or include ferrous components. For example, the housing 200 can include a ferrous component proximal the first outlet 230, wherein the sealing member 400 has a complimentary ferrous element biased toward the housing ferrous component by a magnetic attractive force. However, the housing 200 can be otherwise constructed. The casing can be pressurizable (e.g., hold an interior pressure above atmospheric without failing), or be substantially unpressurizable. The casing can include a vent (e.g., the first outlet 230 and sealing member 400) that vents the contents of the casing to the ambient environment when the interior pressure of the casing exceeds a threshold pressure. The casing is preferably a disc, but can alternatively be prismatic or have any other suitable shape. The casing preferably statically mounts to the pump 40, but can alternatively movably couple to the pump 40 and/or the water regulation mechanism. In one variation of the pump 40, the casing is configured to statically couple to the rotating surface (e.g., via nuts, bolts, screws, adhesive, etc.). The housing 200 is preferably an integral component with the casing of the pump system 10, but can alternatively be a separate component that is mounted to the pump system 10.

The inlet 210 (valve inlet 210) of the housing 200 functions to fluidly connect the extraction mechanism 100 to the pump outlet. The inlet 210 is preferably fluidly connected to the first outlet 230, based on the operation mode of the sealing member 400. In particular, the inlet 210 is preferably fluidly connected to the first outlet 230 when the sealing member 400 is in the unseated position (e.g., second position, unsealed mode, etc.), and is preferably fluidly sealed (e.g., disconnected) from the first outlet 230 when the sealing member 400 is in the seated position (e.g., first position, sealed mode, etc.). The inlet 210 is preferably an aperture through the wall of the housing 200, but can alternatively be defined in the sealing member 400, be defined by a hollow insert extending into the housing lumen, or be otherwise defined.

The first outlet 230 (valve channel) of the housing 200 functions to fluidly connect the extraction mechanism 100 to the second reservoir. More preferably, the first outlet 230 functions to fluidly connect the inlet 210, selection mechanism 300, or the collection area 600 (e.g., an area defined between the inlet 210 and the selection mechanism 300) to the second reservoir, but can alternatively fluidly connect the pump 40 to the second reservoir. The first outlet 230 is preferably fluidly connected to the first inlet 210 by a fluid connection, more preferably a first fluid manifold 220 but alternatively a fluid channel or any other suitable fluid connection. The first outlet 230 is preferably selectively sealed with the sealing mechanism, wherein the first outlet 230 and sealing mechanism cooperatively form a fluid impermeable seal when the sealing mechanism is in the sealed position. The first outlet 230 is preferably an aperture through the wall of the housing 200, but can be defined by a hollow extrusion that partially extends into the housing lumen toward the sealing member 400, or alternatively defined. The first outlet 230 preferably additionally includes sealing elements or one or more spacers along an edge proximal the sealing mechanism, such as an O-ring or grommet, the function to form a fluid seal with the sealing mechanism. In one variation of the extraction mechanism 100, the first outlet 230 is arranged on the same end of the extraction mechanism 100, on a second wall of the extraction mechanism 100 adjacent the first wall supporting the inlet 210. In another variation of the extraction mechanism 100, the first outlet 230 is arranged on the same end of the extraction mechanism 100, on a second wall of the extraction mechanism 100 opposing the first wall supporting the inlet 210. In this variation, the sealing mechanism extends across the entirety of a housing 200 width to substantially seal the inlet 210 from the first outlet 230 in the closed position. However, the first outlet 230 can be otherwise arranged relative to the inlet 210.

Figure 5A:
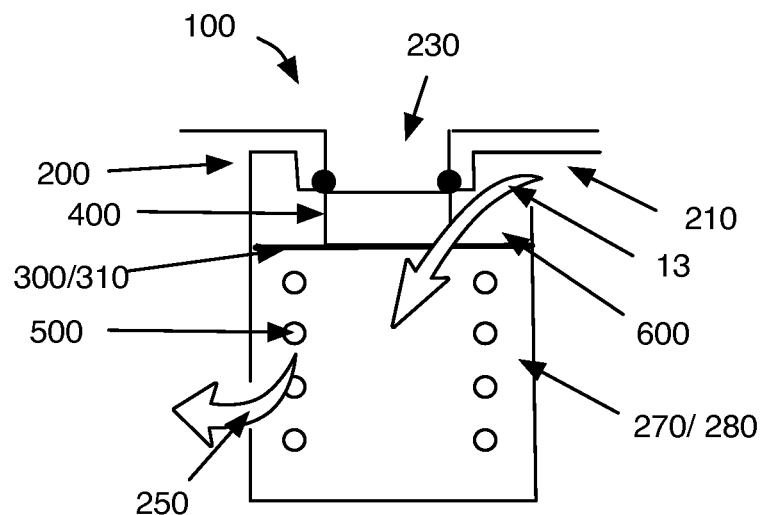
FIGS. 5A and 5B are schematic representation of a third variation of the extraction mechanism, including a membrane, in the closed and open states, respectively.
Figure 5B:
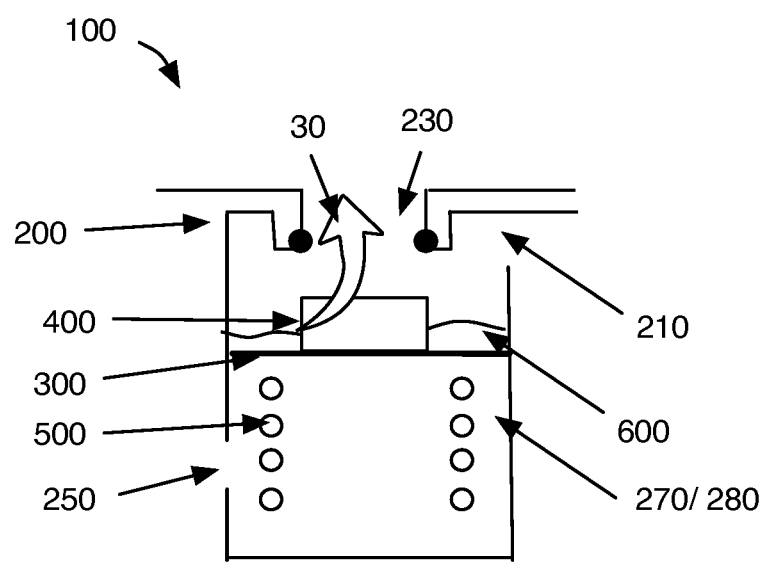
Figure 6:
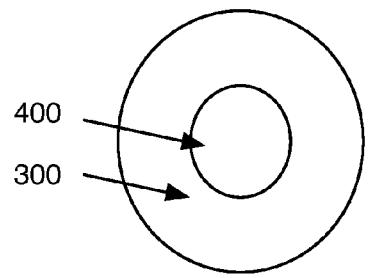
FIG. 6 is a top down view of a first variation of a selection mechanism and sealing member assembly.
Figure 7:
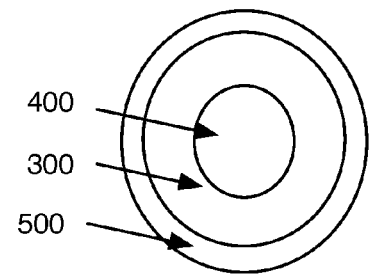
FIG. 7 is a top down view of a second variation of a selection mechanism and sealing member assembly, including a return element.
Figure 8A:
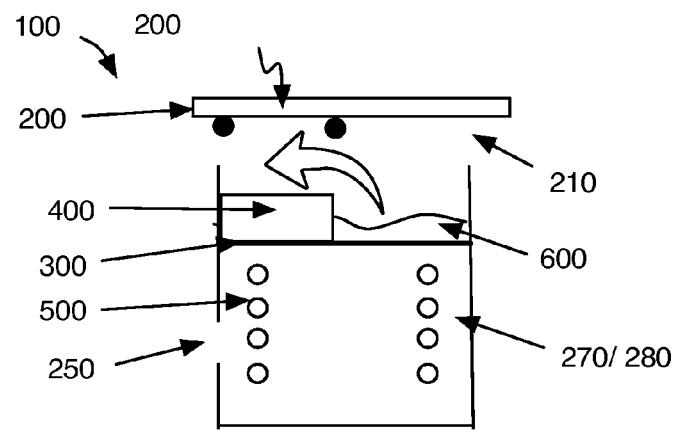
FIGS. 8A and 8B are a side view of a fourth variation of the extraction mechanism and a top down view of the membrane for the fourth variation of the membrane, respectively.
Figure 8B:
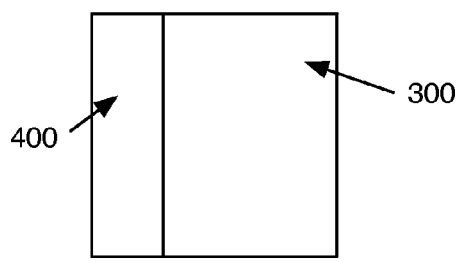

As shown in FIGS. 5A and 5B, the housing 200 can additionally define a second outlet 250 (valve outlet) that functions to fluidly connect the extraction mechanism 100 to the first reservoir 20 (e.g., tire interior 3, pressurization chamber, etc.). More preferably, the second outlet 250 fluidly connects the inlet 210 to the first reservoir 20. The second outlet 250 is preferably fluidly connected to the inlet 210 by a second fluid manifold 280 or fluid connection. The second fluid connection is preferably the member channel 270 in which the sealing member 400 translates, but can alternatively be a separate fluid channel, be the first fluid channel, or be any other suitable fluid connection. The second outlet 250 is preferably defined as an aperture through the wall of the housing 200, but can be defined by a hollow extrusion that partially extends into the housing lumen, or be alternatively defined. The second outlet 250 is preferably arranged distal from the inlet 210 across the selection mechanism 300, but can alternatively be arranged proximal the inlet 210, on the same side as the selection mechanism 300.

The sealing member 400 of the extraction mechanism 100 functions to seal the first outlet 230. The sealing member 400 preferably actuates relative to the housing 200. The sealing member 400 is preferably operable between a first position (e.g., closed position), wherein the sealing member 400 is biased against and substantially fluidly seals the first outlet 230, and a second position (e.g., open position), wherein the sealing member 400 is biased away from the first outlet 230, thereby permitting fluid connection between the first outlet 230 and the inlet 210. The sealing member 400 is preferably dimensioned to seat within the second outlet 250, wherein an O-ring or gasket can maintain a substantially fluid seal between the second outlet 250 and the sealing member 400. Alternatively, the sealing member 400 can have substantially the same dimensions as, or have dimensions larger than, the second outlet 250 opening, wherein the sealing channel substantially blocks the second outlet 250. However, the sealing member 400 can have any other suitable dimensions. The sealing member 400 is preferably supported by the selection mechanism 300, wherein the selection mechanism 300 actuates the sealing member 400 between the open and closed positions.

The sealing member 400 can additionally or alternatively be supported by a return element 500. The return element 500 functions to apply a biasing force on the sealing member 400 toward the first outlet 230. The return element 500 is preferably arranged within the member channel 270, distal the first outlet 230 across the sealing member 400, but can alternatively be arranged on the side of the sealing member 400 proximal the first outlet 230. The return element 500 is preferably a spring, but can be a diaphragm having a spring constant that is connected to the sealing member 400 and statically connected to the member channel 270 walls, a magnetic element, or be any other suitable return element 500. The return element 500 is preferably substantially inert to, or protected from degradation (e.g., corrosion) due to water and/or contaminants in the ambient environment.

In one variation, the sealing member 400 is connected to (e.g., mounted, adhered, or otherwise coupled to) the selection mechanism 300, wherein a portion of the selection mechanism 300 actuates within the member channel 270 to translate the sealing member 400 between the open and closed positions. In a second variation, the sealing member 400 is connected to a face of the selection mechanism 300, wherein a spring connected to the face of the selection mechanism 300 opposing the sealing member 400 biases the sealing member 400 against the first outlet 230. In a third variation, the sealing member 400 is biased (e.g., pushed) against the first outlet 230 by a spring arranged between the sealing member 400 and a wall of the housing 200 opposing the wall supporting the first outlet 230. In a fourth variation, the sealing member 400 is biased (e.g., pulled) against the first outlet 230 by a spring arranged between the wall supporting the first outlet 230 and the sealing member 400. However, the sealing member 400 can be otherwise removably coupled against the first outlet 230.

The extraction mechanism 100 can additionally include a collection area 600 that functions to collect the extracted contaminants 30. The collection area is preferably defined within the reservoir, but can alternatively be defined elsewhere. The collection area is preferably arranged at a position radially outward from the axis of rotation of the extraction mechanism or pump 40, but can alternatively be arranged in any other suitable position. The collection area preferably extends radially from the reservoir wall, such that the collection area is the furthest radially outward portion of the pump 40. The collection area is preferably arranged proximal the outlet to the second reservoir (e.g., tire). More preferably, the outlet to the second reservoir is arranged along a portion of the collection area parallel to a radius extending from the center of rotation or radially inward of the most radially outward portion of the collection area. However, the collection area can be otherwise defined. The first outlet 230 can be fluidly connected with the collection area 600 in response to sealing member 400 operation in the open mode, and fluidly sealed from the collection area 600 by the sealing member 400 in the closed mode. The first outlet 230 preferably egresses the contaminants collected in the collection area 600 in the open mode. The collection area 600 can additionally function as the pressurization chamber that generates the upstream force that actuates the sealing mechanism and/or a sealing mechanism support structure from the closed position to the open position. The collection area 600 is preferably fluidly connected to the selection mechanism 300. In a first variation, as shown in FIG. 3, the collection area 600 can be defined by a portion of the perimeter of the casing surrounding the pump 40 or the reservoir, wherein the collection area 600 is preferably an outcropping of the casing or reservoir perimeter that extends further from the rotational axis along a radial vector than the remainder of the casing. The outcropping is preferably ogive- or wedge-shaped, but can have any other suitable shape. However, the collection area 600 can be any other suitable portion of the casing. In a second variation, the collection area 600 is a separate reservoir downstream from the selection mechanism 300, wherein the selection mechanism 300 separates contaminants from the fluid stream, and the contaminants are flowed to the collection area 600 through a collection channel separate from the first and second fluid channels. In a third variation, the collection area 600 is fluidly connected to the inlet 210. In this variation, as shown in FIGS. 1A, 1B, 5A, and 5B, the collection area 600 is preferably cooperatively defined between the housing 200 and the sealing member 400. The selection mechanism 300 can additionally cooperatively define the collection area 600 with the housing 200 and/or sealing member 400. The face of the selection mechanism 300 proximal the inlet 210 (the upstream side of the selection mechanism 300) and a wall of the housing 200 preferably cooperatively define the collection area 600, but the collection area 600 can be otherwise defined. Alternatively, the collection area 600 can be defined in any other suitable area of the pump 40 or extraction mechanism 100. The extraction mechanism 100 can include one or more collection areas.

The selection mechanism 300 of the extraction mechanism 100 functions to separate contaminants from the fluid stream pumped by the pump 40. More preferably, the selection mechanism 300 functions to separate all or a portion of the water entrained within an air stream, and to expel the water to the ambient environment. However, the selection mechanism 300 can function to separate all or a portion of entrained particulates (e.g., solids, select chemical compounds, etc.) from the fluid stream. The selection mechanism 300 can additionally expel the collected contaminants into a second reservoir, such as the ambient environment.

The selection mechanism 300 is preferably fluidly connected to the inlet 210. More preferably, the selection mechanism 300 is preferably fluidly connected between the inlet 210 and the second outlet 250, but can alternatively or additionally be fluidly connected between the inlet 210 and the first outlet 230. The selection mechanism 300 preferably extends across the second fluid channel connecting the inlet 210 and second outlet 250. The selection mechanism 300 preferably extends across the entirety of the second fluid channel cross section, but can alternatively extend across a portion of the second fluid channel cross section. Alternatively, the selection mechanism 300 can extend in parallel with the second fluid channel longitudinal axis, or be arranged at any other suitable angle relative to the second fluid channel.

The selection mechanism 300 is preferably mounted to the housing interior. The selection mechanism 300 preferably forms a substantially liquid impermeable seal with the housing 200 (e.g., wherein less than a threshold percentage of liquid entrained within the gaseous stream can pass through the seal), but can alternatively form a substantially gas-impermeable seal with the housing 200 (e.g., wherein the gas is forced through the selection mechanism 300), a substantially solid-impermeable seal with the housing 200, not for a seal with the housing 200, or form any other suitable seal with the housing 200. The selection mechanism 300, more preferably the edges of the selection mechanism 300, are preferably statically mounted to the housing interior, wherein the housing interior includes a slot, clip, or other coupling mechanism that substantially statically retains the selection mechanism 300 edge. For example, the selection mechanism 300 can be retained between a first and second housing piece that clip together during assembly. Alternatively, the edges of the selection mechanism 300 can be mobile relative to the housing 200, and translate along the housing interior along longitudinal slots, grooves, tracks, or any other suitable translation mechanism. However, the selection mechanism 300 can be otherwise retained relative to the housing 200.

In one variation of the extraction mechanism 100, the selection mechanism 300 is a wall of the pump 40 or housing 200. In this variation, the centrifugal force generated by pump 40 rotation or rotating surface rotation collects water and any entrained particulates at the system perimeter, wherein the water subsequently flows to the collection area 600 and is vented to the environment.

In another variation of the extraction mechanism 100, the selection mechanism 300 is disposed across a cross section of the fluid channel connecting the inlet 210 and the second outlet 250 (e.g., perpendicular or at a non-zero angle to the direction of fluid flow), wherein fluid from the pump 40 is directed from the inlet 210 and through the selection mechanism 300 prior to exiting from the second outlet 250. The inlet 210 and first outlet 230 are preferably arranged on the upstream side of the selection mechanism 300, and the second outlet 250 is preferably arranged on the downstream side of the selection mechanism 300. However, the inlet 210, first outlet 230, and second outlet 250 can be otherwise arranged.

The selection mechanism 300 preferably includes a membrane 310 that functions to selectively permit contaminants to flow through the membrane while retarding gaseous flow through the membrane. Alternatively, the membrane can selectively retard liquid or contaminant flow through the membrane. The membrane can additionally support the sealing member 400 if included, wherein the sealing member 400 is coupled to a broad face of the membrane, more preferably to the face of the membrane proximal the first outlet 230. This variation can be particularly desirable when the membrane is flexible. The sealing member 400 is preferably formed as an integral part of the membrane, but can alternatively be adhered, welded, or otherwise coupled to the membrane face. The membrane is preferably passive, but can alternatively be active.

The membrane is preferably a selective membrane. The membrane preferably preferentially permits liquid flow therethrough (more preferably at least water flow or polar liquid flow therethrough), while preventing gaseous flow therethrough. Alternatively, the membrane can preferentially permit gas flow therethrough, while selecting for non-gaseous components of the fluid stream (e.g., while preventing liquid or solid contaminant flow therethrough). Alternatively the membrane can selectively permit or transport a given set of molecules, a given material phase, or select for any other suitable material characteristic.

The membrane is preferably a liquid-permeable, gas impermeable membrane, more preferably a water-permeable, substantially gas-impermeable membrane, but can alternatively be a gas-permeable, water-impermeable membrane, gas-permeable, oil-impermeable membrane, a gas-permeable, particulate-impermeable (e.g., solid-impermeable) membrane, or any other suitable barrier. The membrane is preferably hydrophilic, but can alternatively be hydrophobic, oleophobic, or have any other suitable characteristic that preferentially or selectively permits gas flow therethrough. The membrane is preferably a liquid or water selective membrane, but can alternatively be selective for any other suitable compound or physical state. The membrane is preferably a GORE™ membrane, more preferably GORE-TEX™, but can alternatively be a Nafion™ membrane, a reverse-osmosis membrane, a PEM membrane, a PTFE membrane, cloth with a hydrophilic or hydrophobic coating, or any other suitable membrane. The membrane preferably preferentially permits liquid or water flow therethrough at atmospheric pressures or above. Alternatively, the membrane can adjust transportation preferences based on the pressure differential between a first and second broad face of the membrane. For example, the membrane can selectively transport water through the membrane in response to application of a first pressure differential, and transport both water and gas through the membrane (e.g., at same or similar transportation rates) in response to application of a second pressure differential, wherein the second pressure differential is lower than the first pressure differential. However, the membrane can be any other suitable membrane with any other suitable transportation characteristics.

The membrane can additionally or alternatively be formed from multiple layers or segments arranged with normal vectors to the segment broad faces in parallel. For example, the membrane can include a gas-impermeable layer configured to prevent gaseous flow therethrough that is coated with, bonded, laminated, or otherwise coupled to a liquid-permeable layer. Alternatively, the membrane can include a gas-permeable layer configured to permit gaseous flow therethrough that is coated with, bonded, laminated, or otherwise coupled to a liquid-impermeable layer. However, the water selective membrane can include a gas delivery layer or any other suitable number of layers with any suitable property. The gas-permeable layer is preferably a porous layer (e.g., with pores ranging between 0.001 to about 3.0 micrometers, preferably under 0.5 micrometers but alternatively larger), but can alternatively be a diffusive layer (e.g., wherein all or select gasses diffuse or are transported through the layer) or be formed from any other suitable material. The gas permeable layer is preferably additionally liquid impermeable, but can alternatively be liquid permeable. The gas permeable layer can be formed from polyethylene, polypropylene, and copolymers thereof, polysulfone, polyethersulfone, polyarylsulfone, and copolymers thereof, fluororesins such as polytetrafluoroethylene and poly(vinylidene fluoride), fluorochemical-treated or -containing polymers, silicone-based materials, such as poly (dimethyl siloxane) or silicone rubber, polyolefin elastomers, any other material that can be made gas permeable and liquid water impermeable, or any other suitable material thereof. The gas permeable layer can be formed using thermally induced phase transition (TIPT), thermally induced phase separation (TIPS) processes, or any other suitable method. The liquid impermeable layer preferably includes hydrophobic materials, but can alternatively include hydrophilic, oleophobic, or any other suitable material. In another example, the water selective membrane can include a porous membrane coated with a liquid-repelling layer. However, the membrane can be otherwise formed.

The membrane is preferably entirely formed from the water selective membrane, but can alternatively include multiple materials that can provide additional physical and/or chemical characteristics to the membrane. In one variation, the membrane can additionally include a recovery section in addition to the water selective component. The recovery section preferably interfaces (e.g., physically connects) the water selective component with the mounting points on the housing 200, but can alternatively physically connect the water selective component with the sealing member 400, physically connect a first and second portion of the water selective component, or be arranged relative to the gas water selective component in any other suitable manner. The recovery section functions to generate a recovery force that biases the membrane and coupled sealing mechanism toward the second outlet 250 membrane deformation. The recovery section is preferably water selective (e.g., water permeable and gas impermeable), but can alternatively be substantially gas-permeable and water impermeable. The recovery section preferably has a lower elastic modulus (e.g., Young's modulus) than the water selective component, but can alternatively have a higher or equal elastic module. The recovery section is preferably has a high failure strain (e.g., higher than that of the membrane), but can alternatively have an equal or lower failure strain than that of the water selective component. The recovery section is preferably an elastic material, more preferably an elastomer, such as rubber, elastolefin, resilin, elasin, or thermoplastic elastomers, but can alternatively be any other suitable material. In a first example, the recovery section encircles the water selective component, wherein the sealing member 400 is supported by a portion of (e.g., the center) the water selective component. In a second example, the water selective component encircles the recovery section, wherein the sealing member 400 is supported by the recovery section. In a third example, the membrane includes a plurality of concentric, interchanging rings of elastic and gas-impermeable material. However, the membrane can be otherwise configured. In a second variation, the membrane can additionally include layers or sections of hydrophobic and hydrophilic materials. In a third variation, the membrane can additionally include layers or sections of filtration materials. However, the membrane can include any other suitable material.

In one variation of the system, the face of the membrane distal the second outlet 250 is preferably fluidly connected to the fluid manifold that is fluidly connected to the outlet, which is preferably fluidly connected to the reservoir inlet. In operation, gas flows from the pump 40 into the inlet 210, through the membrane, through the fluid manifold (e.g., against the restorative force of the return element 500), and out the second outlet 250 to the first reservoir 20. Water preferably collects at the face of the membrane proximal the inlet 210 (e.g., collection area 600), gradually blocking the airflow through the membrane. The air pressure on the upstream side of the membrane subsequently builds up as air is continually pumped by the system but fails to egress through the valve to the downstream reservoir. When the force of the built-up air pressure on the water mass and/or upstream side of the sealing member 400 exceeds the restorative force of the return element 500, the sealing member 400 is preferably placed in the open position by the upstream force (as shown in FIG. 5B), unsealing the second outlet 250 and permitting air, water, and contaminant flow from the collection area 600 through the second outlet 250. The sealing member 400 is preferably placed in the closed state (as shown in FIG. 5A) by the biasing force generated by the return element 500 once the air pressure on the sealing member 400 is lower than the restorative force of the return element 500.

The selection mechanism 300 can additionally or alternatively be a separation mechanism, wherein the separation mechanism applies a separation force to the pumped fluid to separate liquid and/or solid particulates from the gaseous component of the fluid. The separation force is preferably a centrifugal force, but can alternatively be a vacuum force or any other suitable force. The separation mechanism is preferably a mounting mechanism that statically mounts the extraction mechanism 100 and/or pump 40 to the rotating surface, wherein rotation of the rotating surface applies the centrifugal force. The separation mechanism can additionally or alternatively include an expansion chamber, a coalescing filter, a desiccant, a condenser thermally connected to the ambient environment, a centrifuge, a heat extractor, or any other suitable mechanism that preferentially removes or separates liquid from gas.

The extraction mechanism 100 can additionally include an expulsion mechanism that applies an expulsion force to the collected contaminants (e.g., water and/or solid particulates), to force the contaminants out the first outlet 230. The expulsion force can be the pressure applied by the pumped fluid. The resultant pressure differential can increase the liquid (e.g., water) permeability of the selection mechanism, or can otherwise increase contaminant flow through the selection mechanism. The expulsion force can be a centrifugal force on the collected contaminant mass, wherein the extraction mechanism 100 is coupled to a rotation surface and the first outlet 230 is arranged outward of the selection mechanism 300 along a radius extending from the axis of rotation of the rotating surface. In this variation, the extraction mechanism 100 can be the rotating surface. The expulsion force can additionally or alternatively be a downstream fluid pressure, wherein the expulsion mechanism can be the first reservoir 20 or second reservoir fluidly connected to the second outlet 250. The expulsion force can additionally or alternatively be the return force generated by the biasing element (return element 500), wherein the expulsion mechanism can be the biasing element. The expulsion force can additionally or alternatively be the upstream pressure, gravity, or any other suitable force.

Figure 11:
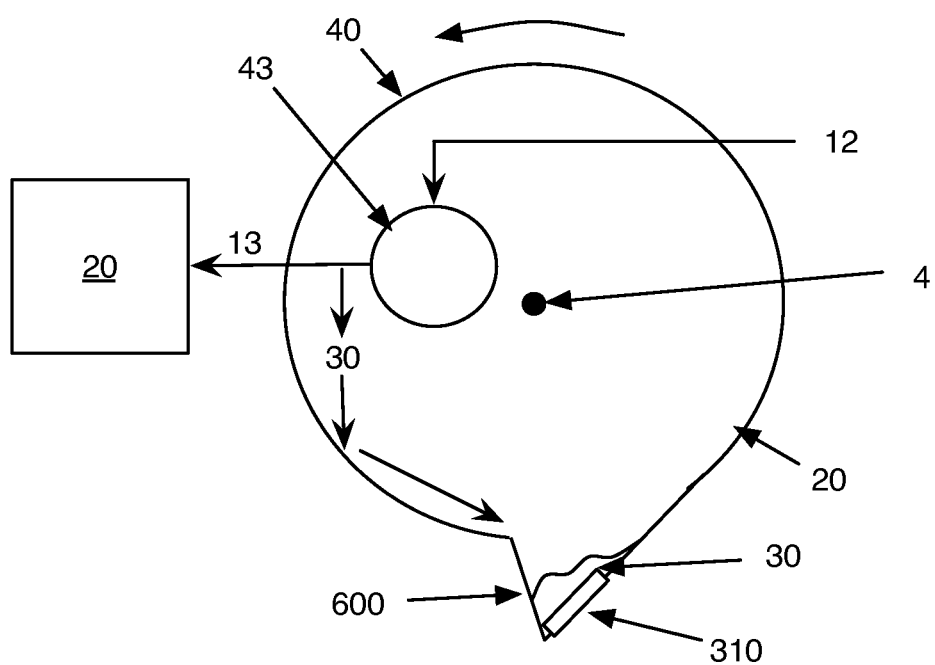
FIG. 11 is a schematic representation of a sixth variation of the extraction mechanism, incorporated within a variation of a pumping system configured to statically couple to a rotating surface.

In one example of the pump system 10 as shown in FIG. 11, the extraction mechanism 100 is located downstream of the pump inlet 210. This pump 40 is preferably utilized on a rotating surface. The collection area 600 is defined by a portion of the casing or reservoir perimeter (e.g., at a position radially outward of the rotating surface axis of rotation), and the membrane or valve is located along the casing perimeter within the collection area 600 (e.g., at a position radially outward of the rotating surface axis of rotation). In one specific variation, the collection area is defined within the first reservoir (e.g., high pressure reservoir) that receives fluid from the pump outlet at a reservoir inlet and passes fluid to the second reservoir (e.g., tire interior) from a reservoir outlet. The collection area is preferably defined as an outcropping arranged and extending radially outward of the remainder of the reservoir body. More preferably, the collection area is defined along a portion of the fluid path extending between the reservoir inlet and reservoir outlet. The membrane or valve is preferably arranged along a side of the collection area. The membrane or valve is preferably arranged at the most radially outward point from the axis of pump rotation 4 within the collection area, but can alternatively be arranged at the most radially outward point of the reservoir or any other suitable pump component. The membrane or valve is preferably arranged proximal the reservoir outlet, more preferably upstream of the reservoir outlet (e.g., between the reservoir inlet and outlet) but alternatively downstream of the reservoir outlet. However, the membrane or valve can be arranged proximal the reservoir inlet, or arranged in any other suitable configuration relative to the reservoir inlet or outlet. In operation, the pump 40 draws gas into the casing interior, wherein centrifugal force generated by the rotating casing separates the denser water particles out along the radial direction, against the casing wall (selection mechanism 300). The water particles collect at the collection area 600. The water particles can be forced out to the ambient environment through the water-permeable, gas-impermeable membrane by the pumped fluid pressure, passed out to the ambient environment by membrane transport mechanisms, vented out to the ambient environment when the collective mass of the extracted water particles exceeds the return force of the return element 500, or otherwise removed from the system.

In another variation of the pump 40, the extraction mechanism 100 is located within the fluid path between the pump 40 and the reservoir. The extraction mechanism 100 preferably includes a housing 200 defining an inlet 210 fluidly connected to the pump outlet, a first outlet 230 selectively connected to the ambient environment, second outlet 250 fluidly connected to the reservoir, and a member channel 270 fluidly connecting the inlet 210 and the second outlet 250; a membrane extending across the member channel cross section and mounted to the housing interior along an edge; and a sealing member 400 actuatably arranged within the member channel 270 and supported on the face of the membrane proximal the first outlet 230 and configured to removably seal the first outlet 230, as shown in FIG. 5. The extraction mechanism 100 can additionally include a spring return element 500 arranged within the member channel 270, distal the second outlet 250 across the sealing member 400, that biases the sealing member 400 against the second outlet 250.

In operation of one variation of the system, the pump 40 pumps fluid into the reservoir. The centrifugal force generated by the rotational surface on the reservoir (statically mounted to the rotational surface) separates denser components of the fluid stream, such as liquid and solids, from the gaseous component of the fluid stream. The gaseous stream is preferably passed to the In operation of another variation of the system, the pump 40 pumps fluid to the inlet 210, wherein the membrane permits gas flow through the fluid manifold, out the outlet to the reservoir. The membrane retards liquid flow through the fluid manifold, wherein liquid (e.g., water) collects at the inlet 210 (second outlet 250) face of the membrane. The valve opens when the mass of water surpasses a threshold mass (e.g., when the force applied by the water mass exceeds the return force of the return element 500), thereby venting the water to the ambient environment. The water can be vented in a direction radially outward of the rotating surface, in a direction normal to the rotating surface (e.g., parallel to the axis of rotation), or at any other suitable angle. This variation can additionally include a water extraction mechanism 100 arranged between the pump outlet and the water regulation mechanism.

As a person skilled in the art will recognize from the previous detailed description and from the figures and claims, modifications and changes can be made to the preferred embodiments of the invention without departing from the scope of this invention defined in the following claims.

I claim:

1. A pumping system configured to pump fluid from the ambient environment to a target reservoir, the pumping system comprising:
   a fluid pump configured to statically mount to a rotating surface, the pump configured to rotate about an axis of rotation;
   a pump reservoir statically coupled to the fluid pump and configured to fluidly couple to the target reservoir, comprising:
      a collection area defined along a portion of the pump reservoir radially outward of the axis of rotation; and
      a liquid separation member arranged along a portion of the collection area, the liquid separation member comprising a membrane configured to preferentially permit liquid flow therethrough.

2. The pumping system of claim 1, wherein the membrane is water permeable and substantially gas impermeable.

3. The pumping system of claim 2, wherein the membrane comprises a reverse osmosis membrane.

4. The pumping system of claim 2, wherein the membrane comprises a NAFION® membrane.

5. The pumping system of claim 1, wherein the membrane fluidly connects a pump reservoir interior to an ambient environment.

6. The pumping system of claim 1, wherein the collection area extends radially outward from a main body of the reservoir.

7. The pumping system of claim 1, further comprising an expulsion force mechanism configured to apply an expulsion force to accumulated liquid within the collection area.

8. The pumping system of claim 7, wherein the expulsion mechanism comprises the fluid pump, wherein the expulsion force comprises a pressure force generated by pressurized fluid within the pump reservoir.

9. The pumping system of claim 1, further comprising a separation force mechanism configured to apply a separation force to liquid entrained within the pumped fluid.

10. The pumping system of claim 9, wherein the separation force comprises a centrifugal force, wherein the separation force mechanism comprises a static mounting system configured to statically mount the pumping system to the rotating surface.

11. The pumping system of claim 1, wherein the fluid pump comprises: a drive mechanism having a rotational axis, the drive mechanism comprising: a cam comprising an arcuate bearing surface having a non-uniform curvature, the cam rotatable about the rotational axis; and an eccentric mass coupled to the cam that offsets a center of mass of the drive mechanism from the rotational axis; and a pump cavity positioned a radial distance away from the axis of rotation and rotatably coupled to the cam, the pump cavity comprising a first actuating element and a first chamber; and a force translator coupling the arcuate bearing surface to the actuating element, the force translator comprising a force translator axis having an arcuate position fixed to an arcuate position of the pump cavity.

12. The pumping system of claim 11, wherein the force translator comprises a roller, wherein the axis comprises a roller rotational axis, wherein the roller rotational axis is statically coupled to an actuating axis of the first actuating element.

13. The pumping system of claim 12, wherein the first actuating element comprises a piston.

14. The pumping system of claim 12, wherein the fluid pump further comprises a second pump cavity comprising a second actuating element and a second chamber, the second actuating element statically connected to the first actuating element.

15. The pumping system of claim 14, wherein the second actuating element has a surface area different from a surface area of the first actuating element, wherein the second chamber is fluidly connected to the first chamber.

16. A method for contaminant removal from a fluid stream, comprising:
pumping the fluid stream into a first reservoir;
separating the fluid stream into separated liquid and a gaseous stream within the first reservoir by applying a separation force to the fluid stream;
pumping the gaseous stream from the first reservoir to a second reservoir;
collecting the separated liquid in a collection area within the first reservoir;
applying, with the pumped fluid, a pressure force to bias the separated liquid against a membrane; and
preferentially permitting liquid flow to an ambient environment in response to the pressure force application by the membrane.

17. The method of claim 16, wherein preferentially permitting liquid flow through the membrane comprises using a water-selective membrane.

18. The method of claim 16, wherein the water-selective membrane comprises a reverse osmosis membrane.

19. The method of claim 18, wherein applying a separation force comprises applying a centrifugal force to the fluid stream.

20. The method of claim 19, wherein applying the separation force comprises statically mounting the first reservoir to a rotating surface having an axis of rotation, wherein the collection area is arranged along a portion of the first reservoir radially outward of the axis of rotation and the membrane is arranged along a wall of the collection area.

21. The method of claim 20, wherein pumping the fluid stream into the first reservoir comprises pumping the fluid stream from the ambient environment by leveraging relative motion between a gravity element and a pump statically mounted to the rotating surface.

* * * * *